United States Patent [19]
Choy

[11] Patent Number: 5,883,751
[45] Date of Patent: Mar. 16, 1999

[54] MAGNETIC TAPE RECORDING AND REPRODUCING APPARATUS PREVENTING AXIAL VIBRATION OF ROTARY HEAD CYLINDER

[75] Inventor: Jin Seung Choy, Seoul, Rep. of Korea

[73] Assignee: Samsung Electronics Co., Ltd., Kyungki-Do, Rep. of Korea

[21] Appl. No.: 904,340

[22] Filed: Jul. 31, 1997

[30] Foreign Application Priority Data

Jul. 31, 1996 [KR]  Rep. of Korea ................... 1996 32110

[51] Int. Cl.⁶ ....................................................... G11B 5/52
[52] U.S. Cl. ............................................. 360/84; 360/107
[58] Field of Search ......... 360/84, 107, 130.22–130.24, 360/108

[56] References Cited

U.S. PATENT DOCUMENTS

| | | | |
|---|---|---|---|
| 4,890,177 | 12/1989 | Katoh et al. | 360/107 |
| 5,021,908 | 6/1991 | Morimoto et al. | 360/107 |
| 5,151,839 | 9/1992 | Ota | 360/108 |
| 5,729,407 | 3/1998 | Koh et al. | 360/107 |

FOREIGN PATENT DOCUMENTS

1-277315  11/1989  Japan.

*Primary Examiner*—Jefferson Evans
*Attorney, Agent, or Firm*—Sughrue, Mion, Zinn, Macpeak & Seas, PLLC

[57] ABSTRACT

A magnetic tape recording and reproducing apparatus prevents vibration caused by rotation of a rotary drum constituting a rotary head cylinder. The magnetic tape recording and reproducing apparatus includes a drum base having a through-hole, a static drum fixed on the drum base, a rotary drum having at least one head for recording and reproducing a signal on and from a magnetic tape, and a shaft which penetrates the central axis of the rotary drum and the static drum and is bearing-coupled with the rotary drum. An axial support portion which is engaged with the shaft, and inserted into the through-hole of the drum base, elastically supports the shaft so that the shaft maintains the central axial direction during rotation of the rotary drum, with a result that an axial vibration caused by the rotation of the rotary drum can be prevented.

7 Claims, 4 Drawing Sheets

MAGNETIC TAPE RECORDING AND REPRODUCING APPARATUS PREVENTING AXIAL VIBRATION OF ROTARY HEAD CYLINDER

BACKGROUND OF THE INVENTION

The present invention relates to a magnetic tape recording and reproducing apparatus having a rotary head cylinder, and more particularly, to a magnetic tape recording and reproducing apparatus which can prevent vibration caused by rotation of a rotary drum constituting a rotary head cylinder.

A general magnetic tape recording and reproducing apparatus having a rotary head cylinder records a signal on a magnetic tape or reproduces the signal therefrom. Such a magnetic tape recording and reproducing apparatus uses a rotary head cylinder on which at least one head is installed in order to read recorded data from a magnetic tape or records data thereon. A case where such a rotary head cylinder is used in an apparatus requiring a high speed rotation and a high density recording such as a digital video cassette recorder (VCR) will be described with reference to FIG. 1.

FIG. 1 is a sectional view showing a rotary head cylinder for use in a conventional magnetic tape recording and reproducing apparatus. The rotary head cylinder shown in FIG. 1 includes a cylindrical rotary drum 10 which rotates at high speed, a cylindrical static drum 20 which is located in the lower side of the rotary drum 10, and a shaft 18 which penetrates the central axis of the rotary drum 10 and the static drum 20 and is inserted into a through-hole 32 provided in the static drum 20.

The rotary drum 10 is connected with the shaft 18 via a bearing 16, and includes a motor unit 12 for rotation of the rotary drum 10 therein. The rotary drum 10 has the same diameter as the upper portion of the static drum 20. A head 14 for recording data on a magnetic tape or reproducing data therefrom is installed on the edges in the lower surface of the rotary drum 10. The head 14 is disposed so that it is embedded by a minute distance from the circumferential surface of the rotary drum 10 toward the shaft 18. A tape lead 22 for guiding the magnetic tape is formed on the outer circumferential surface of the static drum 20. The tape lead 22 guides the magnetic tape via contact to the magnetic tape so that the head 14 can facilitate a recording and reproduction operation with respect to the magnetic tape.

Fixed protrusions 26 formed on the upper surface of a drum base 24 are inserted into insertion holes 28 formed on the lower edges of the static drum 20. Screw grooves 34 for fixing the static drum 20 to the drum base 24 are formed between the insertion holes 28. A number of the screw grooves 34 are installed in the lower surface of the static drum 20 in the form of surrounding the shaft 18, and are individually connected with fixed screws 30. The static drum 20 is fixed to the drum base 24 by such a screw coupling.

The rotary head cylinder having the above-described structure does not have a complete symmetrical structure by weight around a rotational axis. As a rotary head cylinder becomes compact, a static drum is fabricated to become thinner and thinner as well. Therefore, when such a rotary head cylinder rotates at high speed, an axial vibration occurs. The axial vibration deforms the thin static drum 20 in thickness even though a small amount of load is applied to the rotary head cylinder. That is, the vibration shock caused by the rotary drum 10 is transferred to the static drum 20 via the shaft 18, to thereby deform the shape of the thin static drum 20. Such a deform of the static drum causes the tape lead 22 not to guide a magnetic tape well. As a result, the head installed on the rotary drum 10 does not trace accurately with respect to the magnetic tape.

Also, in the case of a camcorder, noise generated by the rotary head cylinder may be recorded on a mantic tape together with a recording signal.

SUMMARY OF THE INVENTION

To solve the above problems, it is an object of the present invention to provide a magnetic tape recording and reproducing apparatus having a rotary head cylinder for effectively reducing deformation of a static drum from an effect of axial vibration caused by rotation of a rotary drum.

To accomplish the above object of the present invention, there is provided a magnetic tape recording and reproducing apparatus comprising: a drum base having a through-hole; a static drum fixed on the drum base; a rotary drum having at least one head for recording and reproducing a signal on and from a magnetic tape; a shaft which penetrates the central axis of the rotary drum and the static drum and is bearing-coupled with the rotary drum; and axial support means which is engaged with the shaft, inserted into the through-hole of the drum base, and elastically supports the shaft so that the shaft maintains the central axial direction during rotation of the rotary drum.

In an embodiment of the present invention, the axial support means comprises a connection member which is inserted into the through-hole of the drum base, and is screw-coupled with a female screw portion of the shaft in which a head is formed in the opposite side of the static drum around the drum base; and an elastic member which is supported by the head of the connection member and the surface of the drum base facing the head, to thereby elastically support the shaft.

In another embodiment of the present invention, the axial support means comprises a connection member which is inserted into the through-hole of the drum base, and having a first male screw portion which is screw-coupled with a female screw portion of the shaft and a second male screw portion formed in the opposite side of the first male screw portion around the drum base; a nut which is screw-coupled with the second male screw portion and an elastic member which is supported by the nut and the surface of the drum base facing the nut, to thereby elastically support the shaft.

BRIEF DESCRIPTION OF THE DRAWINGS

The preferred embodiments are described with reference to the drawings wherein.

DETAILED DESCRIPTION OF THE INVENTION

Preferred embodiments of the present invention will be described in detail with reference to the accompanying drawings.

Figure 1:
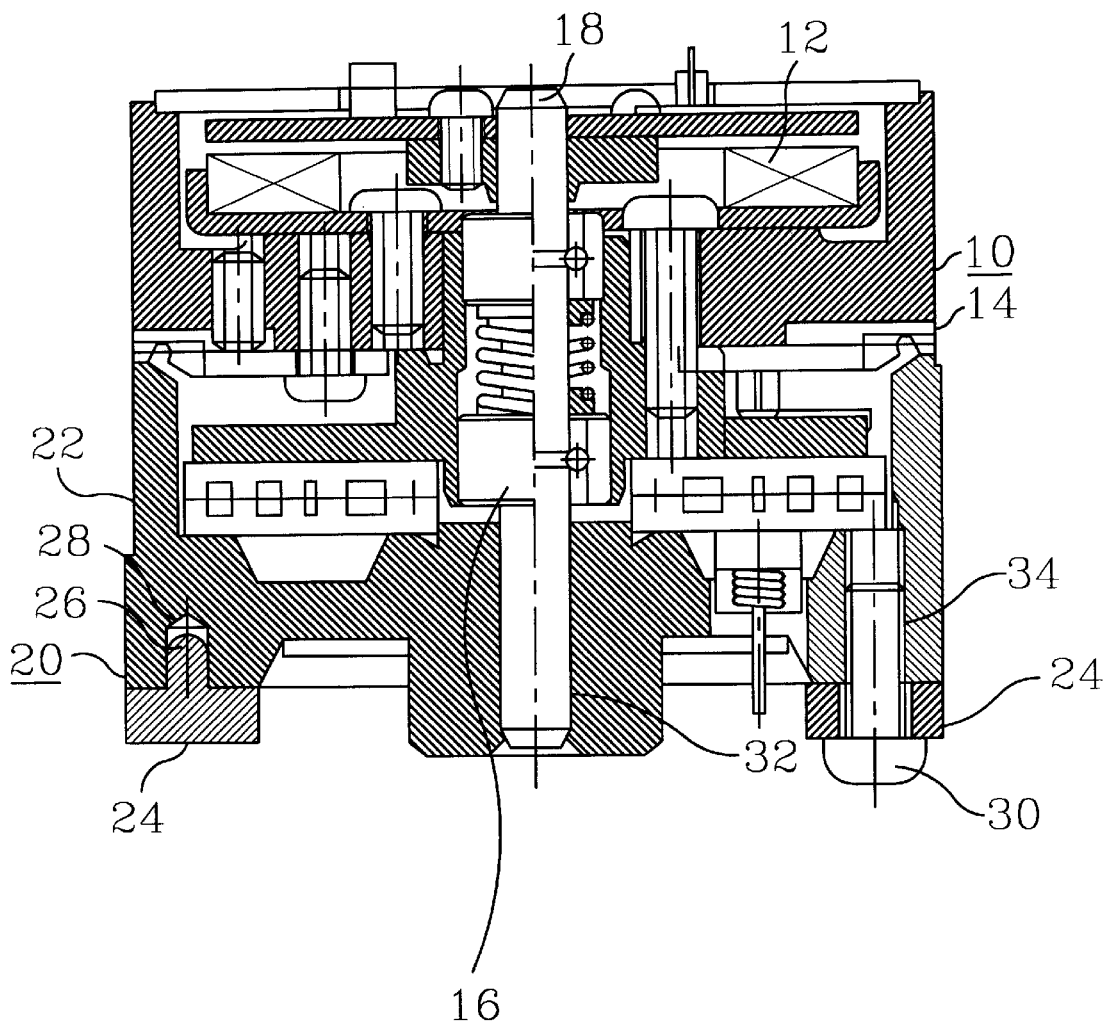
FIG. 1 is a sectional view showing a rotary head cylinder for use in a conventional magnetic tape recording and reproducing apparatus.
Figure 2:
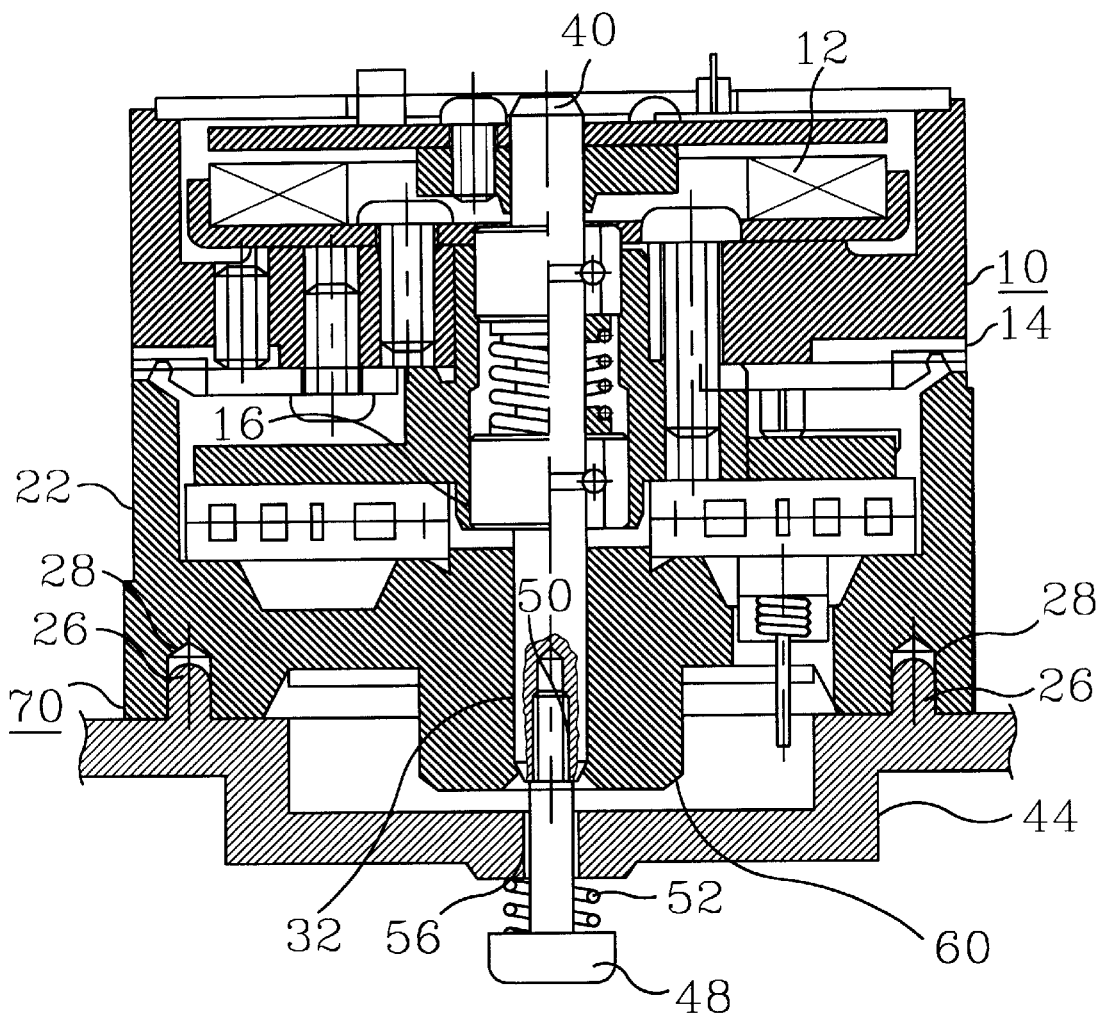
FIG. 2 is a sectional view showing a rotary head cylinder for use in a magnetic tape recording and reproducing apparatus according to an embodiment of the present invention.
Figure 3:
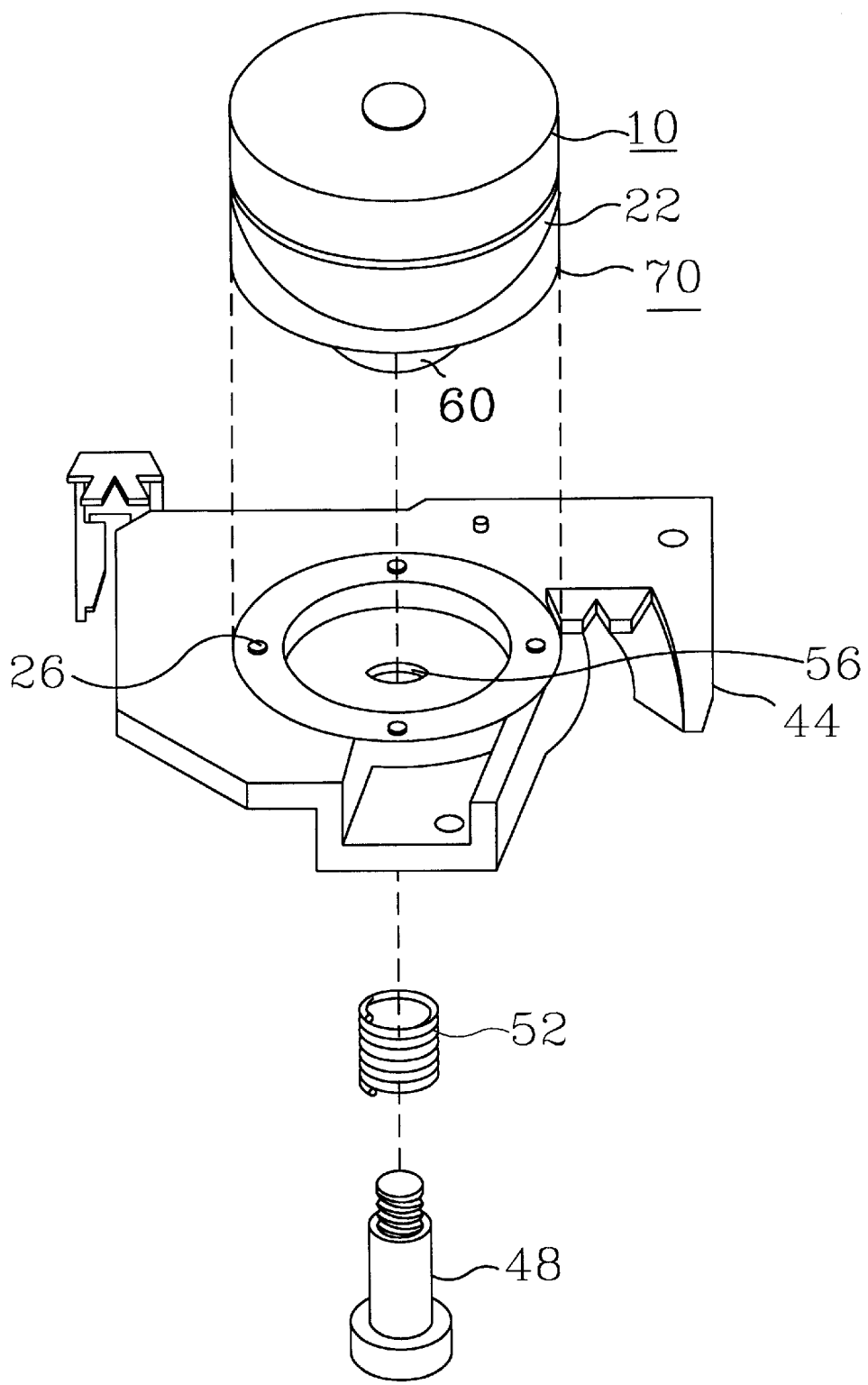
FIG. 3 is an exploded perspective view of the FIG. 2 rotary head cylinder.

In FIG. 2, a rotary head cylinder for use in a magnetic tape recording and reproducing apparatus according to an embodiment of the present invention, includes a rotary drum 10, a shaft 40, a drum base 44 and a static drum 70. The shaft 40 has screw grooves which are coupled with the static drum 70, differently from the shaft 18 of FIG. 1. The drum base 44 is spaced from protrusion 60 which is located in the lower central portion of the static drum 70. Fixed protrusions 26 which are formed on the upper surface of the drum base 44 are inserted into insertion holes 28 which are formed on the edges in the lower surface of the static drum 70. The fixed protrusions 26 are arranged on the drum base 44 as shown in FIG. 3 showing an exploded perspective view of the FIG. 2 rotary head cylinder.

The drum base 44 also includes a through-hole 56 which is formed along the central axis line of the shaft 40. A fixing screw 48 is inserted into the through-hole 56 and is screw-coupled with the screw groove 50 on the shaft 40. A spring 52 is installed between the head of the fixing screw 48 and the drum base 44. The spring 52 is supported by the head of the fixing screw 48 and the drum base 44 facing the head, to there by provide an elastic force between the shaft 40 and the fixing screw 48. In particular, the spring 52 provides a proper elastic force so that an axial vibration is not generated by the rotary drum 70 even though the rotary drum 70 rotates at high speed. In an embodiment of the present invention, the spring 52 is a coil spring, however, it may be replaced by a plate spring or a rubber spring.

In the FIG. 2 embodiment, the static drum 70 is fixed to the drum base 44 via the fixed protrusions 26 and the insertion holes 28, and the axial vibration is prevented via the fixing screw 48 and the spring 52. Thus, the FIG. 2 rotary head cylinder can be easily fabricated compared with the FIG. 1 apparatus using the screw grooves 34 and the fixing screw 30.

The other components among the FIG. 2 elements are the same as those of FIG. 1 and thus a reassigned with the same reference numerals. Also, since the structure, layout and function of the FIG. 2 elements corresponding to those of FIG. 1 are same as those of FIG. 1, the detailed description thereof will be omitted.

Figure 4:
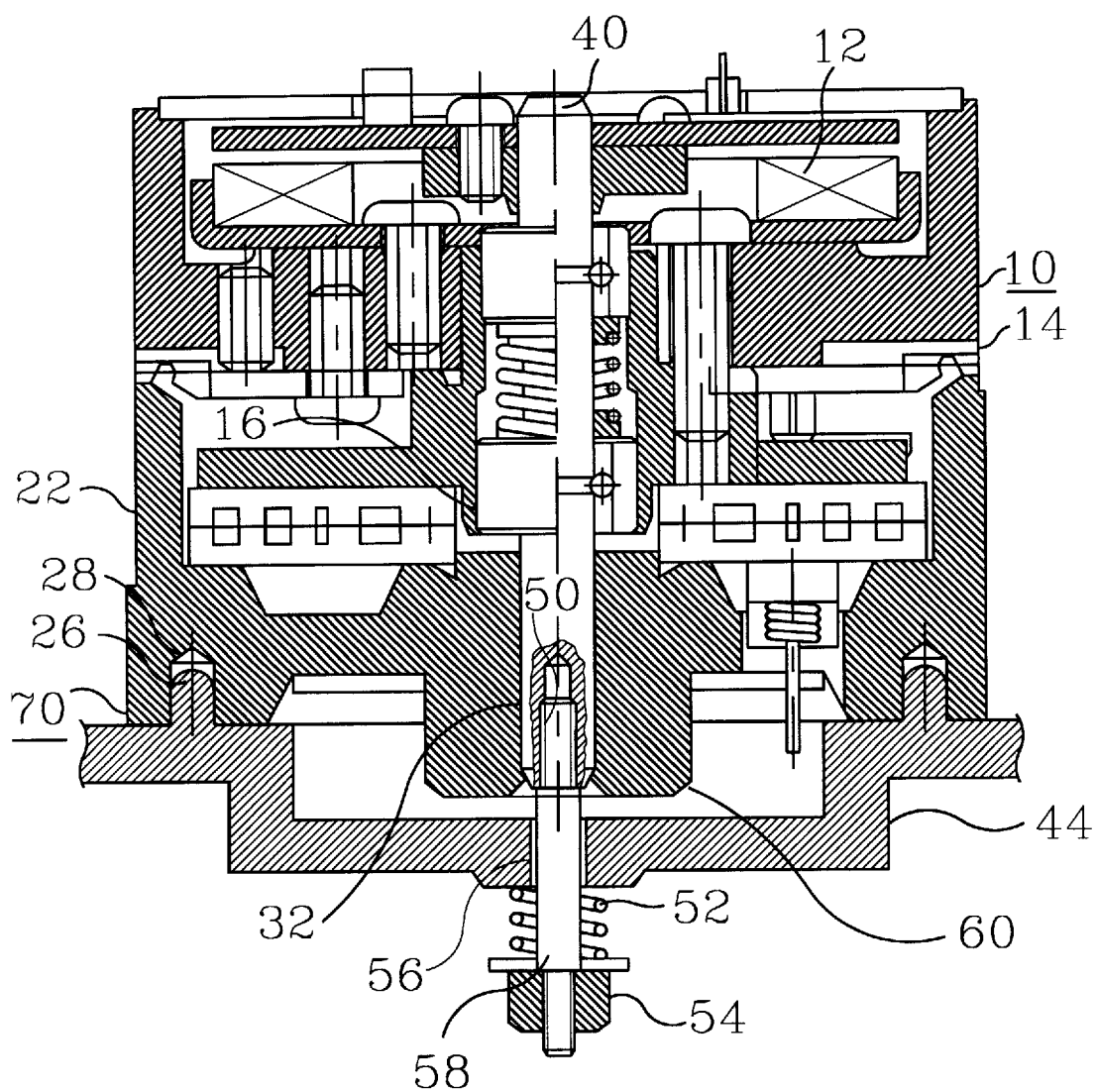
FIG. 4 is a sectional view showing a rotary head cylinder for use in a magnetic tape recording and reproducing apparatus according to another embodiment of the present invention.

FIG. 4 is a sectional view showing a rotary head cylinder for use in a magnetic tape recording and reproducing apparatus according to another embodiment of the present invention. The rotary head cylinder of FIG. 4 uses a screw member 58 on both ends of which male screw threads are formed instead of the fixing screw 48 of FIG. 2. The screw member 58 is screw-coupled with screw grooves 50 on which female threads are formed in the lower side of the shaft 40. Also, the screw member 58 is screw-coupled with a nut 54 in the lower side of the drum base 44. The spring 52 is interposed between the drum base 44 and the nut 54, and provides a proper elastic force so that an axial vibration is not generated by the rotary drum 70 even though the rotary drum 70 rotates at high speed.

As described above, the present invention elastically supports a rotary head cylinder with respect to a drum base along the rotational axis, to thereby prevent an axial vibration generated by rotation of a rotary drum. Thus, when the present invention can be applied to a camcorder, a problem that noise is mixed with a recording signal can be prevented. Also, an assembly work is simplified and facilitated by fixing a rotary head cylinder to a drum base, using protrusions formed on the drum base and insertion holes formed on a static drum.

While only certain embodiments of the invention have been specifically described herein, it will be apparent that numerous modifications may be made thereto without departing from the spirit and scope of the invention.

What is claimed is:

1. A magnetic tape recording and reproducing apparatus comprising:

a drum base having a through-hole;

a static drum fixed on said drum base and having a central axis;

a rotary drum having a central axis and at least one head for recording and reproducing a signal on and from a magnetic tape;

a shaft which penetrates the central axis of said rotary drum; and axial support means engaged with said shaft, inserted into the through-hole of said drum base, and for elastically supporting said shaft so that the shaft maintains the central axial direction during rotation of said rotary drum.

2. The magnetic tape recording and reproducing apparatus according to claim 1, wherein protrusions are formed on said drum base to be facing insertion holes formed peripherally along the lower surface of said static drum wherein said protrusions are inserted in said insertion holes.

3. The magnetic tape recording and reproducing apparatus according to claim 2, wherein said insertion holes and said protrusions are formed in an axial symmetrical structure around said central axis of said static drum and said rotary drum.

4. The magnetic tape recording and reproducing apparatus according to claim 1, wherein said shaft comprises a female screw portion at the portion of said shaft which penetrates the central axis of said static drum, and, said axial support means comprises a connection member which is inserted into the through-hole of said drum base, and is screw-coupled with said female screw portion of said shaft, wherein said connection member has a head formed at a lower surface of said drum base; and an elastic member which is supported between the head of said connection member and the surface of said drum base facing the head, to thereby elastically support said shaft.

5. The magnetic tape recording and reproducing apparatus according to claim 4, wherein said elastic member is a coil spring.

6. The magnetic tape recording and reproducing apparatus according to claim 1, wherein said shaft comprises a female screw portion at the portion of said shaft which penetrates the central axis of said static drum, and, said axial support means comprises a connection member which is inserted into the through-hole of said drum base, and having a first male screw portion formed on a first end of said connection member, which is screw-coupled with said female screw portion of said shaft, and a second male screw portion formed in the opposite end of the connection member with respect to said first male screw portion;

a nut which is screw-coupled with said second male screw portion; and an elastic member which is supported by said nut and the lower surface of said drum base facing said nut, to thereby elastically support said shaft.

7. The magnetic tape recording and reproducing apparatus according to claim 6, wherein said elastic member is a coil spring.

* * * * *